United States Patent [19]

Lawton et al.

[11] Patent Number: 5,664,305
[45] Date of Patent: Sep. 9, 1997

[54] METHOD AND APPARATUS FOR FIBROUS ARTICLE ENGAGEMENT AND DISENGAGEMENT - INCLUDING TWO DIFFERENT NEEDLE TYPES

[75] Inventors: Peter Geoffrey Lawton, Halifax; Norman Smith, Rugby, both of Great Britain

[73] Assignee: Aerospace Preforms Limited, Halifax, England

[21] Appl. No.: 256,756
[22] PCT Filed: Jan. 20, 1993
[86] PCT No.: PCT/GB93/00124
    § 371 Date: Sep. 23, 1994
    § 102(e) Date: Sep. 23, 1994
[87] PCT Pub. No.: WO93/15250
    PCT Pub. Date: Aug. 5, 1993

[30] Foreign Application Priority Data

Jan. 24, 1992 [GB] United Kingdom .................. 9201605

[51] Int. Cl.⁶ .................................................. D04H 18/00
[52] U.S. Cl. .......................... 28/113; 28/107; 28/111
[58] Field of Search .......................... 28/106, 107, 108, 28/110, 111, 112, 103; 198/379, 631, 678.1, 680, 692, 693, 723, 774.1, 776

[56] References Cited

U.S. PATENT DOCUMENTS 4,277,531  7/1981  Picone ........................ 28/107
4,977,653 12/1990  Pum .............................. 28/115
5,018,255  5/1991  Bolliand ........................ 28/107

FOREIGN PATENT DOCUMENTS 0 424 988  5/1991  European Pat. Off. .......... D04H 3/10

*Primary Examiner*—C. D. Crowder
*Assistant Examiner*—Larry D. Worrell, Jr.
*Attorney, Agent, or Firm*—Adams Law Firm, P.A.

[57] ABSTRACT

A succession of fibrous sheet segments (10) are supplied from a rotary magazine (12) to a rotating bowl (14). Segments are added to the bowl with their adjacent radial edges abutting each other and are passed beneath a reciprocating needle board (20), whereby filaments from the segments in upper layers are displaced into segments in lower layers to bind the segments together and form a self-supporting preform. Two needle heads (22) are able to move up and down and rotate in order to pick up a segment from the store and deposit that segment on the bowl. A few barbed needles (22A) pick up the segment and more grooved needles (22B) push through fibre to tack the segments down. A conical roller (28) bears against the top of the segments after they leave the needle board to bear against the preform to compress the fibres and also to provide a monitor of the distance between the needle board or the mounting block and the top layer of the preform.

28 Claims, 3 Drawing Sheets

METHOD AND APPARATUS FOR FIBROUS ARTICLE ENGAGEMENT AND DISENGAGEMENT - INCLUDING TWO DIFFERENT NEEDLE TYPES

This application is a national stage application, according to Chapter II of the Patent Cooperation Treaty. This application claims the priority date of Jan. 24, 1992 for Great Britain Patent Application No. 9201605.4.

BACKGROUND OF THE INVENTION

The present invention relates to a method of, and apparatus for engaging and disengaging a fibrous article, and to methods of, and apparatus for forming a fibrous assembly. The present invention is particularly, although not exclusively, applicable to fibrous articles which are to be made into fibrous assemblies or polyacrylonitrile filaments which are subsequently heated and transformed into a carbon-carbon product for use with brakes.

SUMMARY OF THE INVENTION

According to one aspect of the present invention a method of engaging and disengaging a fibrous article comprises causing relative movement between a support for the article and a first type of needle such that the first type of needle is caused to extend into the article; causing relative movement between the support and the first type of needle such that the first type of needle now provides the support for the article by engaging the fibres of the article, and then engaging the article with a support by causing relative movement between a support for the article and a second type of needle such that the second type of needle is caused to extend through the fibrous article and to take fibres out of the general extent of the article into the support to engage with the support.

After the fibres have been engaged with the support, the method may further comprise causing relative movement between the second type of needle and the article such that the second type of needle comes back through the article and the article remains engaged with the support and is disengaged from the needles.

The method may comprise causing relative movement between the first and second type of needles and the support or article simultaneously.

The method may comprise the second type of needle extending into but not through the article when the first type of needle supports the article.

The method may comprise moving the first and second type of needles to cause the relative movement.

The method may comprise engaging the article with the first type of needle from a first support and then engaging fibres of the article with a second support different from the first support.

The method may comprise engaging the article with the first type of needle from an upwardly facing support and, alternatively or additionally, disengaging the article from the needles by engaging fibres of the article with an upwardly facing support.

The method may comprise reorientating the article when the first type of needle supports the article. The reorientating of the article may be achieved by moving the article about a pivot axis.

The method may comprise using less of the first type of needle than the second type. The density of the first type of needle may be greater towards an edge region of the article than in a central region of the article.

The method may comprise the second type of needle causing the article to engage with a support comprising a fibrous support. That fibrous support may be provided by a fibrous article which has itself previously been engaged with another support by a second type of needle.

The second type of needle may cause the article to engage with a rotatable support which support may be rotating during engagement.

The first type of needle may engage the fibres of an article located on a rotatable support and may engage the fibres of the article when the support is rotating. Alternatively or additionally, the first type of needle may be arranged to engage an article from a stack of such articles.

The method may comprise a first set of first and second type of needles and a second set of first and second type of needles operating such that, when the first type of needle from the first set is engaging the fibres of a first article the second type of needles of the second set is able to extend through the fibres of a second article to engage fibres of said second article with another support.

The method may comprise causing relative movement between the two types of needles.

The method may comprise causing relative movement between the needles and a stripper board.

The method may comprise engaging the article with the first type of needle when in an extended position and engaging the article with a support by causing the second type of needle to move from a retracted to an extended position. The method may further comprise moving the first type of needle from the extended to a retracted position. The method may comprise causing the relative movement of the two types of needle between the retracted to the extended positions relative to a stripper board.

According to another aspect of the present invention, fibrous article engagement and disengagement apparatus comprises a first type of needle which is arranged to engage and support fibres of an article and a second type of needle which is arranged to move relative to a fibrous article to push fibres through the general extent of that article.

The first and second type of needle may be fixed relative to each other.

The portion of the first type of needle which is arranged to engage with fibres of the article may be arranged to be located nearer to an article which apparatus is arranged to approach than the portion of the second type of needle which is arranged to push fibres through the general extent of the article.

The first type of needle may have a greater density towards an outer region than towards an inner region. There may be more second types of needle than first type. The second type of needle may be generally evenly distributed.

The first type of needle may be movable, and may be movable in two transverse directions, one of which directions may be about a pivot axis.

The first and second type of needle may be movable relative to each other. An actuator may be provided arranged to cause movement of one type of needle relative to the other. Each type of needle may be movable between an extended position in which, in use, the needles of that type extend at least partially into a fibrous article and a retracted position in which the needles of that type do not extend into a fibrous article.

The apparatus may include a stripper board. The tips of one or both types of needle may be arranged to be retracted into the stripper board when in the retracted position.

The apparatus may include a first set of first and second types of needle and a second set of first and second types of needle. The first and second sets may be spaced from each other. The first and second sets may be movable and may be constrained to move simultaneously.

According to another aspect of the present invention, a method of forming a fibrous assembly from a plurality of fibrous layers comprises forming a stack of layers by rotating the stack during formation and needling the stack such that fibres from a more recently added layer extend into the previous layer, and tacking the most recently added layer to the previous layer prior to needling that most recently added layer whereby the tacking force is sufficient to substantially prevent radial inwards movement of the layer as it passes into the needling.

The tacking may be achieved by the second type of needle as previously referred to.

According to a further aspect of the present invention, fibrous assembly forming apparatus comprises a rotatable support on which fibrous layers are arranged to be successively placed to rotate therewith, needling apparatus including an array of reciprocatable needles arranged to pass through a plurality of fibrous layers to carry fibres from a more recently added layer into a previously added layer and tacking means arranged to tack a most recently added layer to a previously added layer prior to that most recently added layer reaching the needling apparatus.

The tacking means may include a second type of needle as previously referred to.

According to another aspect of the present invention, a method of forming a fibrous assembly from a plurality of fibrous articles comprises article supply means automatically providing successive articles to build up successive layers of the assembly, and causing fibres from at least some subsequently supplied layers to extend into at least some previously supplied layer to engage the layers with each other.

The supply means may cause some fibres from an article being supplied to extend into a previously supplied article.

The supply means may supply articles onto previously supplied, rotating articles. The supply of articles to the rotating assembly being formed may be coordinated with the rotation such that, for example, a newly supplied article abuts the immediately previously supplied article.

The supply means may remove articles to be added to the assembly from a stack of articles or, alternatively or additionally from a rotatable store of articles.

The method may comprise using the first and second type of needles as previously referred to which comprise the supply means.

According to a further aspect of the present invention, fibrous assembly forming apparatus includes supply means arranged to supply successive fibrous articles to be incorporated into a fibrous assembly and fibre displacement means arranged to cause fibre from one article to extend into another article to engage the articles.

The supply means may include means for engaging a fibrous article and means for disengaging the fibrous article from the supply means. The supply means may include means for engaging the fibres of an article with a previously supplied article when disengaging the article from the supply means. The supply means may include the first and second type of needle as previously referred to.

The supply means may include a stack of articles arranged to be supplied and may include a rotatable magazine for articles to be supplied.

The apparatus may include control means arranged coordinate the supply of articles as the assembly is being built up.

According to another aspect of the present invention, a method of forming a fibrous assembly from a plurality of fibrous layers in which the layers are successively stacked and fibres from at least some of the layers extend into at least one adjacent layer to engage the layers comprises exerting a compressive force on the layers as the number of layers in the stack increases.

The method may comprise exerting the compressive force on substantially the complete width of the layers.

The method may comprise exerting the compressive force throughout the period during which the layers are stacked.

The method may comprise exerting the force on the layers after at least some of the fibres from a most recently stacked layer have been caused to extend into an adjacent layer.

The method may comprise maintaining the compressive force substantially constant.

The method may comprise increasing the distance between a member acting on one side of the stack to exert a compressive force on that side and the other side of the stack. The method may comprise increasing that distance in dependence upon the compressive force being exerted on the stack. The method may comprise maintaining one side of the stack at a substantially constant location during build up of the stack.

The method may comprise rotating the stack during stacking of the layers with the layers extending generally radially with respect to that axis. The compression may be applied by a roller which, for instance when the stack is to be rotated during formation, may be a frusto conical member.

According to a further aspect of the present invention, a fibrous assembly forming apparatus comprises engagement means for causing fibres in at least some layers in a stack to extend into at least one adjacent layer and compression means arranged to act on one side of a stack.

The compression means may be arranged to act on the stack after the fibre displacement means have caused fibres in at least some layers in a stack to extend into at least one adjacent layer.

The compression means may comprise a roller and may comprise a frusto conical member.

The compression means may be arranged to act across the complete width of the stack.

Adjustment means may be provided, which means are arranged to vary the distance between the compression means acting on one side of the stack and the other side of the stack.

The adjustment means may be arranged to be operable in dependence upon the compression force being exerted by the compression means.

Monitoring means may be arranged to maintain the compressive force substantially constant.

The present invention also includes a fibrous article which has been formed by a method or apparatus as herein referred to.

The present invention includes any combination of the herein described features and limitations.

The present invention may be carried into practice in various ways, but one embodiment will now be described by way of example and with reference to the accompanying drawings in which:

DETAILED DESCRIPTION OF THE INVENTION

Figure 1:
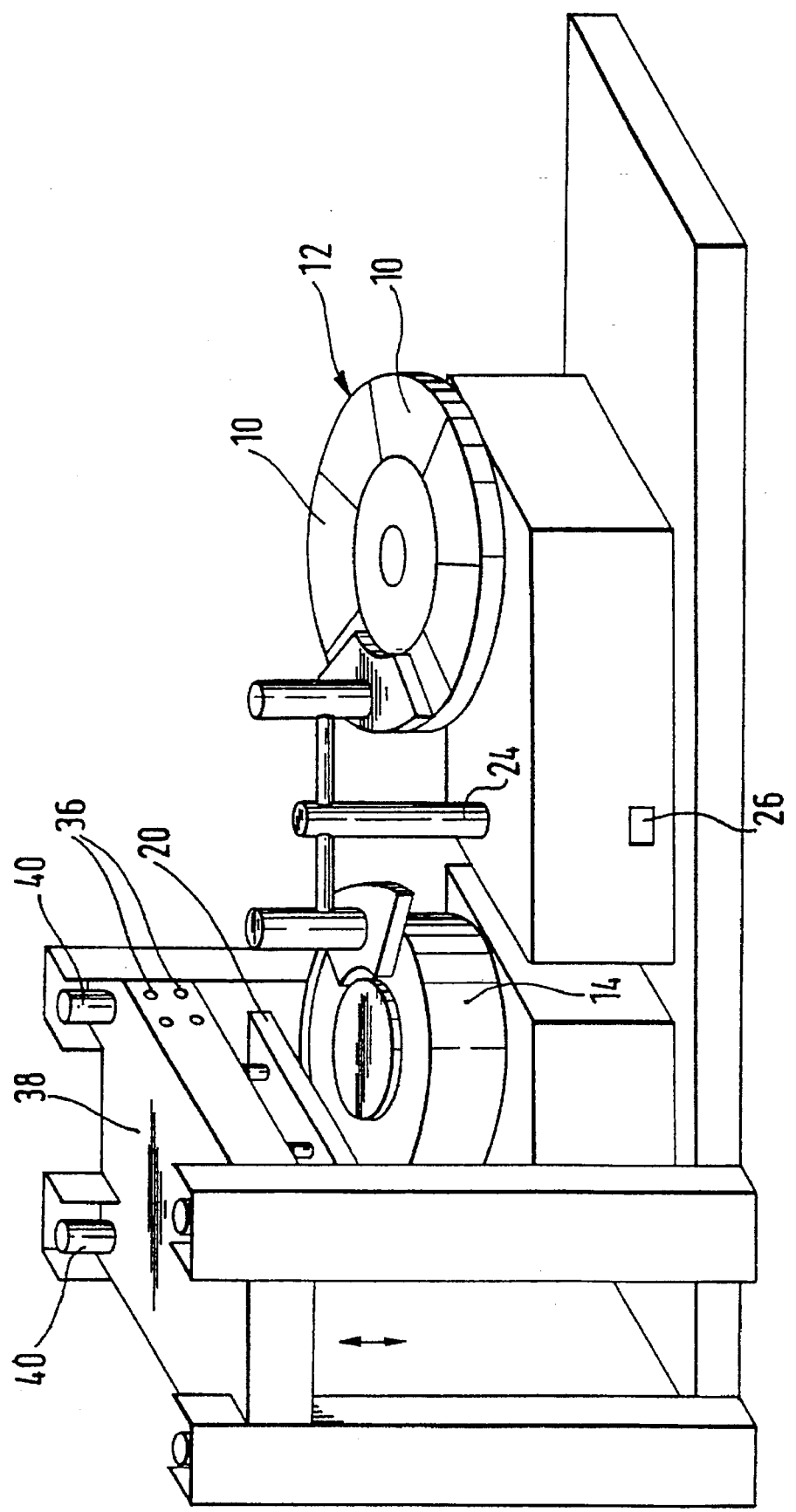
FIG. 1 is a schematic isometric view of a machine for forming a shaped fibrous fabric structure.
Figure 2:
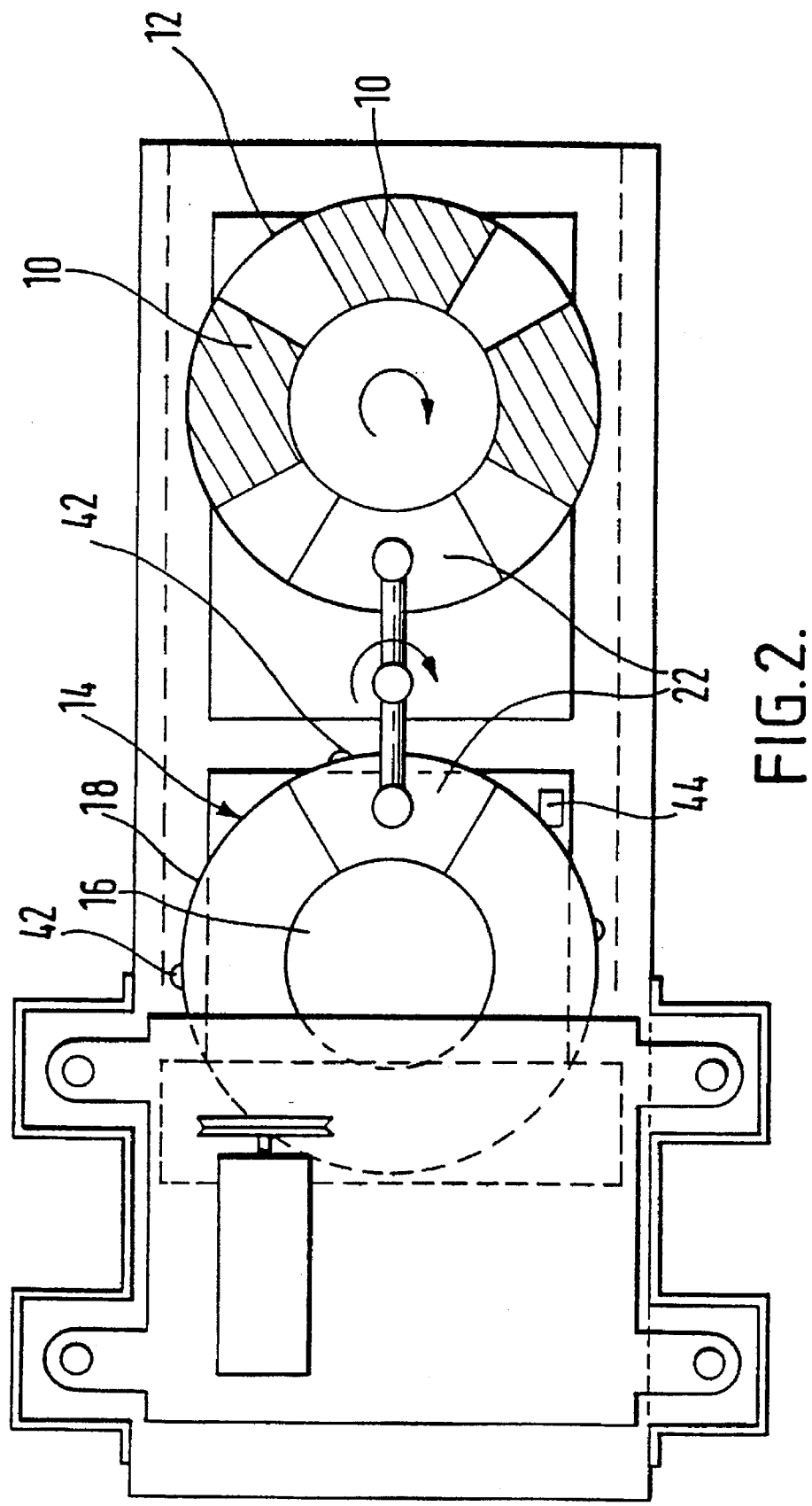
FIG. 2 is a plan view of the machine shown in FIG. 1.

The machine shown in FIGS. 1 and 2 is designed to produce a disc shaped preform of polyacrylonitrile filaments. The preform may be carbonised, impregnated with a resin and then baked at a very high temperature so that both the fibrous filaments and the resin are changed to a carbonaceous form whereby there is produced a shaped article made of carbon reinforced with carbon fibres.

The polyacrylonitrile material is rendered suitable for carbonising by at least partial oxidation effected by passing the material through a furnace containing an oxidising atmosphere. It emerges from the oxidation process in the form of a continuous single filament textile fibre, that is to say, it is flexible and capable of being woven. However, the filamentary material has a highly polished surface sheen and is consequently quite difficult to handle.

For use in the process of the invention, the material is obtained in tow form and in a specific example, each tow is constituted by some 320,000 continuous filaments. It is necessary to assemble the filaments in the form of a uni-directional sheet (warp). The filament should be held taut and touching each other to produce total "cover" of the planar area of the sheet and in a typical example the thickness of the sheen of filaments is about 3 millimeters.

The applicants' co-pending European Patent Application published under No. 0 424 988 shows apparatus and methods for forming fabric sheets and segments of fabric sheets for use in forming the preform, as well as apparatus and methods for forming that preform. The disclosure of that earlier application is hereby incorporated into the present specification and any of the segments referred to herein may be formed as described in that earlier publication.

As shown in FIGS. 1 and 2, a succession of segments 10 are supplied from a rotary magazine 12 to a rotating bowl 14. The rotating bowl includes a central pillar 16, and an outer cylindrical wall 18 with which the inner and outer circumferential portions respectively of each segment co-operate to locate the segments in the radial direction. The base of the bowl which supports the preform may be fixed relative to the pillar wall 18 or, alternatively may be movable in an axial direction in order that the top of the preform, as it is being built up, can remain at a generally constant elevation with the bottom of the preform gradually getting lower.

The segments are added with their adjacent radial edges abutting each other and are passed beneath a reciprocating needle board 20 as the board rotates. The needles displace filaments from the segments in upper layers to the segments in lower layers to bind the segments together and form the self supporting shape required of the preform.

When the leading part of a segment passes beneath the reciprocating head a radially inwards force is exerted on the segment which, if not opposed, would draw the trailing part of the segment inwards and prevent the correct formation of the preform. Each of the two needle heads 22 shown in FIGS. 1 and 2 is able to pick up a segment from the store and deposit that segment on the rotating bowl and enable the segment, when it reaches the reciprocating needle board 20, to resist the inwards force then experienced. The needle heads do this in the following way.

Figure 3:
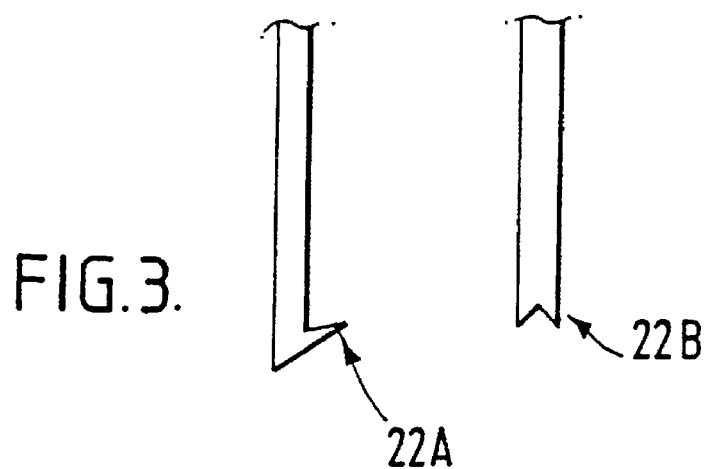
FIG. 3 is a schematic view of two types of needle used with the machine shown in FIGS. 1 and 2.

The heads include downwardly projecting needles 22A and 22B (shown in FIG. 3) which extend over an area corresponding to the shape of a segment. The density of the needles on the heads 22 is significantly less than the density of the needles on the reciprocating board 20. Furthermore the needles include two types of needle; those with a reverse barb 22A and the conventional needles 22B which push fibres in the direction in which the end of the needle is pushed. Approximately 15, 20 or 30, reverse barb needles 22A are provided as compared to the 200 or 300 conventional needles 22B.

The reverse barb needles may extend downwardly to the same extent as the conventional needles or may extend further downwardly from the conventional needles. When picking up a segment from the magazine 12 a control arm 24 is rotated about its axis and lowered by a control means 26 to bring the ends of the needles towards the segment in the store 12. The reverse barb needles 22A enter the segment, and may pass through the segment for the barbs to engage with fibres so that, when the head is raised by the control arm 24, the segment is caused to be lifted. The reverse barb is provided by a needle having an upright "v" portion as compared to the conventional needles 22B which present a downwardly facing "v". To assist in the lifting action, the reverse barb needles are located mainly around the periphery of the segment, but a relatively few reverse barb needles are also located over the inner portion of the segment. Where the reverse barb needles 22A enter a segment but do not pass through it, the heads 22 may lift a top segment off a stack of segments from the magazine. Alternatively, the reverse barb needles 22A can lift a single segment 10 from each compartment of the magazine.

When a needle head 22 has engaged a segment, the head is raised, by lifting the control arm 24, and moved so that the segment is over the bowl 14, by rotating the arm 24, and then deposited onto the base of the bowl or a lower fibrous layer, by lowering the arm 24.

As the arm 24 is lowered, the conventional needles 22B are caused to push through and extend downwardly below the segment which has been maneuvered. Those conventional needles 22B push the fibres of the segment shown into a lower layer or layers to cause fibres to engage and hold the segment "tacked down". The head 22 is then raised clear of the segment, and the modest force exerted by the reverse barb needles 22A during the raising of the head is negligible compared to the tack down force effected by the conventional needles 22B and the segment remains in place. Accordingly, with simple reciprocal movement of the head a fibrous segment can be lifted, deposited and tacked down.

The control arm 24 is described as performing the rotational movement, to alter the location of the heads 22, and the reciprocal movement to enable the segments to be picked up or tacked down. In an alternative embodiment (not shown), the arm 24 does not reciprocate and instead each head is individually reciprocally mounted, and possibly the stroke of each head may be different or variable for instance in dependence upon whether a segment is being picked up or tacked down.

Control means (not shown) may be provided to coordinate rotation of the magazine, rotation of the bowl and the pick up and tack down of the segments. The bowl can be halted or slowed down when the segments are tacked down. Alternatively, the segments can be tacked down whilst the bowl is rotating at its normal rate.

Once the segment has been tacked down, rotation of the bowl brings the segment towards the needle board 20 and the fibres of the segment are pushed down into lower layers to interengage the layers further. The inwards force exerted on the segment during the early engagement of the needle head with the top segment is resisted by the tacking down of the segment achieved during deposition.

Figure 4:
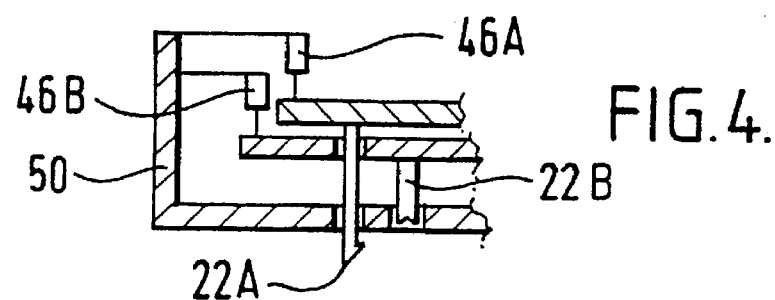
FIG. 4 is a schematical cross-sectional view of the two types of needle shown in FIG. 3 showing their mounting arrangement with respect to a stripper board.

FIG. 4 shows an alternative arrangement for the barb needles 22A and the conventional needles 22B in which the needles may be moved independently from each other upon operation of actuators 46A and 46B. Apart from the relative movement and the consequential difference in operation, the movement of the head to pick up, relocate and deposit a segment is as previously described. In the embodiment shown in FIG. 4, during pick up of a segment, the reverse barb needles extend beneath a stripper board 48 and the conventional needles 22B have their tips co-extensive with the needle board, as shown in the figure. During pick up only the reverse barb needles 22A penetrate the segment.

Upon deposition the head 50 is lowered until the segment engaged by the needles 22A is located on top of a preceding segment and the stripper board 48 rests on, or urges the segment downwardly. The actuator 46A is then operated to retract the reverse barb needles 22A from the segment and the actuator 46B is operated to push the needles 22B downwardly through the segment into the layer or layers beneath. If desired the actuator 46A could be operated before, or at the same time as, or after the operation of the actuator 46B. The actuator 46B is then operated again to cause the needles 22B to be retracted from the preform and the complete head and stripper board are then moved away from the preform.

Figure 5:
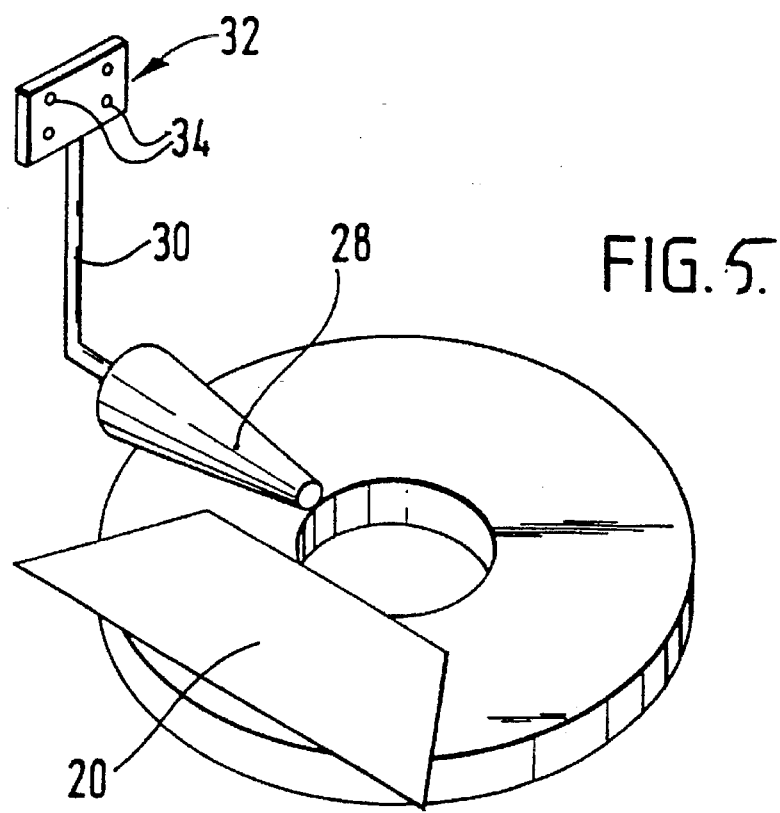
FIG. 5 is a schematic isometric view showing the orientation of a conical roller in relation to the fabric structure during its formation.

As shown in FIG. 5, a conical roller 28 is provided. The roller 28 is arranged to bear against the top of the segments immediately after they leave the needle board 20. The roller 28 is rotatably mounted on an arm 30 which has a mounting plate 32 at the upper end. A series of bolts (not shown) are arranged to pass through openings 34 in the plate 32 into threaded openings 36 formed in a mounting block 38 (shown in FIG. 1). The needle board 20 is supported by, and extends downwardly from the mounting block 38. A series of screws 40 are located at each corner region of the block and threadably engage the block. By rotating the screws 40 with drive means (not shown) the block 38 is raised or lowered. Raising of the block, for instance, may be required to enable a complete preform to be removed from the bowl with lowering of the block enabling the needles to engage the next preform.

The roller 28 serves two purposes, the first being to bear against the preform to compress the fibres and the second being to monitor the distance between the needle board or mounting block 38 and the top layer of the preform.

The axis of the roller extends along a radial line with respect to the rotational axis of the bowl 14, and across the extent of the preform. Accordingly, the complete upper surface of the preform is subjected to the compression force of the roller during a revolution and the fibres are compressed to approximately 0.6 g/cc. The conical shape of the roller corresponds to the variation in circumferential speed of the preform as the radial distance from the rotational axis of the bowl varies. Accordingly no slipping occurs between the preform and any part of the roller.

As previously mentioned, the base of the bowl which supports the preform may be movable in an axial direction so that, as the preform is built up, the base moves down to maintain the distance between the top of the needle stroke and the upper layer of the preform substantially constant. A biasing force (not shown) may be exerted to oppose downwards movement of the base of the bowl, and the roller may push against the top of the preform to cause the base to be pushed down when the downwards force exerted by the roller through the compressed preform exceeds the biasing force acting upwardly on the base. That biasing force may be applied hydraulically, pneumatically or mechanically such as by a spring, or in any other convenient way.

Alternatively, the base of the bowl can be lowered in steps which may be triggered by the engagement of cams 42 constrained to rotate with the bowl with a stationary switch 44. The base can be lowered upon each engagement by a predetermined amount. Alternatively the size of the step can be varied in dependence upon the upwards force exerted by the preform on the roller by means of a strain gauge incorporated above the roller (not shown). Alternatively or additionally, whether there is to be a step or not, the downwards movement of the base of the bowl may be controlled by a program which may, for instance, cause the elevation of the base to remain constant during several revolutions after the last segment has been added to result in the upper layers receiving a greater degree of needling and therefore further compaction and interengagement than would otherwise be the case.

We claim:

1. A method of engaging and disengaging a fibrous article from a first type of needle with there being a second type of needle, a first support and a second support, the method comprising the steps of:
    (a) causing relative movement between the first support with which the article is associated and the first type of needle such that the first type of needle is caused to extend into the article;
    (b) causing relative movement between the first support and the first type of needle such that the first type of needle provides the support for the article by first engaging the fibers of the article; and
    (c) engaging the article with the second support by causing relative movement between the second support for the article and the second type of needle such that the second type of needle is caused to extend through the fibrous article and take fibers out of the article and into the second support to engage those fibers with the second support.

2. A method as claimed in claim 1, wherein after the fibers have been engaged with the second support relative movement between the second type of needle and the article is caused such that the second type of needle comes back through the article and the article remains engaged with the second support and is disengaged from the needles.

3. A method as claimed in claim 1 or 2, and including the step of moving the first and second type of needles simultaneously relative to the article.

4. A method as claimed in claim 1, and including the step of extending the second type of needle into but not through the article when the first type of needle supports the article.

5. A method as claimed in claim 1, wherein one of the steps of causing relative movement comprises the step of moving the first and second type of needles.

6. A method as claimed in claim 1, and including the steps of engaging the article with the first type of needle from the first support and then engaging fibers of the article with the second support.

7. A method as claimed in claim 1, and including the step of engaging the article with the first type of needle from the first support which first support includes a support surface that faces the first type of needles.

8. A method as claimed in claim 1, and including the step of disengaging the article from the needles by engaging fibers of the article with the second support, which second support includes an upwardly facing second support surface that faces the needles.

9. A method as claimed in claim 1, and including the step of reorienting the article when the first type of needle supports the article.

10. A method as claimed in claim 1, and including the step of using fewer of the first type of needle than the second type of needle.

11. A method as claimed in claim 10, wherein the article has an edge region and a central region and wherein the density of the first type of needle is greater towards the edge region of the article than in the central region of the article.

12. A method as claimed in claim 1, and including the step of the second type of needle causing the article to engage with the second support, wherein the second support comprises a fibrous support.

13. A method as claimed in claim 12, wherein the fibrous support comprises a fibrous article which has itself previously been engaged with another support by the second type of needle.

14. A method as claimed in claim 1, wherein the first type of needle engages an article from a stack of such articles.

15. A method as claimed in claim 1, and including the steps of:
    (a) providing a first set of said first and said second types of needles;
    (b) providing a second set of said first and said second types of needles; and
    (c) operating said first set and said second set of needles such that, when the first type of needle from the first set is engaging the fibers of a first article, the second type of needles of the second set is able to extend through the fibers of a second article to engage fibers of said second article with another support.

16. A method as claimed in claim 1, and including the step of causing relative movement between the two types of needles.

17. A method as claimed in claim 1, wherein the method comprises forming a fibrous assembly, said assembly including a plurality of stacked layers, the assembly being formed by rotating the stacked layers during formation and needling the stacked layers such that fibers from a more recently added layer extend into a previous layer, tacking of the most recently added layer to the stacked layers prior to needling the most recently added layer into the stacked layers, wherein the tacking force is sufficient to substantially prevent radially-inwardly movement of the layer as it passes into the needling, wherein the method uses the first type of needle to move a fibrous article to the stacked layers and uses the second type of needle to engage and tack the most recently added article to the stacked layers.

18. Fibrous article engagement and disengagement apparatus comprising a first type of needle having a free end and a barb, the barb facing away from the free end of the needle, the first type of needle being arranged to engage fibers of a generally planar article in a first orientation and to support the article during movement of the article to a second orientation and a second type of needle which is mounted to move relative to a fibrous article to push fibers through the plane of that article.

19. Apparatus as claimed in claim 18, and including fixing means, said fixing means fixing the first and second type of needle relative to each other.

20. Apparatus as claimed in claim 19, wherein each of the first and second types of needles includes ends, the ends of the first type of needle extending further than the ends of the second type of needle.

21. An apparatus as claimed in claim 18, in which the first and second types of needles occupy an area, said area having an outer region and an inner region, the first type of needle having a greater density towards said outer region than towards said inner region of said area.

22. An apparatus as claimed in claim 18, in which there are more needles of the second type than needles of the first type.

23. An apparatus as claimed in claim 21, in which the second type of needle is generally evenly distributed over the area.

24. An apparatus as claimed in claim 18, and including a first set of first and second types of needles and a second set of first and second types of needles.

25. A method of forming a fibrous assembly including a plurality of fibrous layers using a plurality of fibrous sectors, the assembly having an axis, the method comprising the steps of:
    (a) forming a stack of layers by rotating the stack about the axis during formation and adding the fibrous sectors and needling the sectors in the stack such that fibers from a more recently added sector extend down into previous layers of sectors; and
    (b) tacking down the most recently added sector prior to the needling of that sector into the previous layers with sufficient tacking force to substantially prevent radially-inward movement of the segment toward the axis as the segment passes into the needling.

26. A method according to claim 25, including providing sector supply means, the method including the step of automatically moving successive sectors to the assembly and then tacking down the sectors, the sector supply means both moving and tacking down the sectors.

27. A fibrous assembly forming apparatus comprising:
    (a) a rotatable support with fibrous sectors being arranged to be successively placed on the support with the sectors rotating with the support;
    (b) a needling apparatus including an array of reciprocatable needles arranged to pass through a plurality of fibrous layers to carry fibers from one sector into another sector; and
    (c) tacking means arranged to tack said one sector to another sector; and
    (d) rotation of the support being arranged to move said one sector from said tacking means to said needling apparatus.

28. Apparatus as claimed in claim 27, and including
    fibrous sector supply means, said sector supply means being arranged to automatically provide successive sectors to the assembly;
    said sector supply means also comprising said tacking means.

* * * * *